Sept. 29, 1925.                J. A. WILLOUGHBY                1,555,345
                                  LOOP ANTENNA
                                Filed June 26, 1919
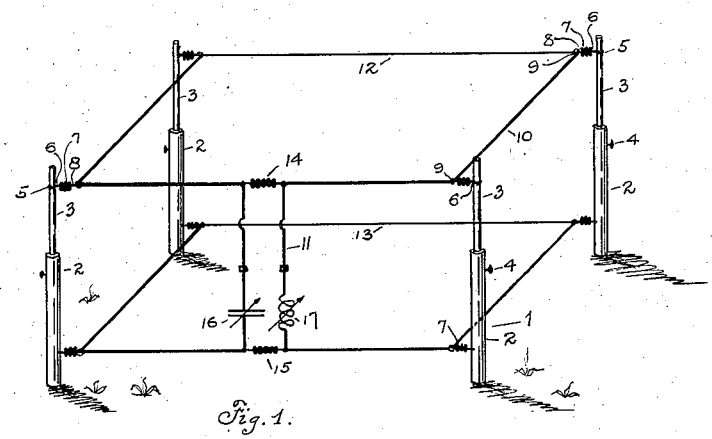
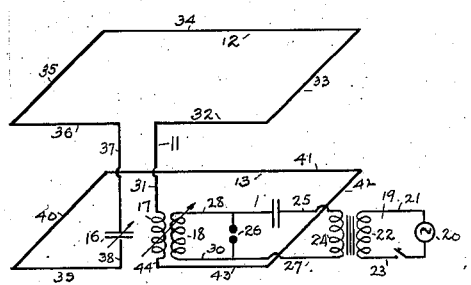
John A. Willoughby
Inventor Patented Sept. 29, 1925.

1,555,345

UNITED STATES PATENT OFFICE.

JOHN A. WILLOUGHBY, OF WASHINGTON, DISTRICT OF COLUMBIA.

LOOP ANTENNA.

Application filed June 26, 1919. Serial No. 306,846.

*To all whom it may concern:*

Be it known that JOHN A. WILLOUGHBY, a citizen of the United States, residing at Washington, in the District of Columbia, has invented certain new and useful Improvements in Loop Antennæ, of which the following is a specification.

This invention relates to radiosignaling designed more particularly for use in connection with manually controlled aircraft and vehicles when visibility is poor. Although the invention is primarily designed for use in connection with aircraft, it is susceptible to employment with other means of travel.

Air pilots frequently find it difficult when flying at night or in foggy weather, or when clouds intervene between the aircraft and the earth, to find the landing field which they desire. Furthermore, when an aircraft is flying at a comparatively low altitude, it is difficult for its pilot to receive a directional signal which is of material aid in finding the landing field.

The purpose of this invention is to establish a zone of electrical disturbances constituting a magnetic field which zone in transverse section is a substantially closed loop of high frequency currents, the said zone extending from a plurality of looped antennæ on or adjacent to the earth to an indefinite distance from the earth's surface into the atmosphere. This produces a magnetic field of looped cross section and with a neutral zone constituting the core of the magnetic field.

The accompanying drawings forming a part of my specification, illustrate a practical embodiment of my ideas capable of carrying out the underlying or basic principles of this invention and in these drawings:

Fig. 1 is an elevation of the circuit as might be employed on an aviation field.

Fig. 2 is a diagrammatic view showing the general construction of the circuit with spark means for excitation.

Referring now in detail to the drawings:

The numeral 1 designates the supporting frame composed of a plurality of posts 2, having slidable rods 3, capable of being lowered or heightened and made fast by screw 4.

At the upper end of the rod are slots 5, around which rope 6, attached to a non-conducting member 7 is made fast. To the other end of the non-conducting member is rope 8 having ring 9 attached to its end through which is threaded the circuit cable which constitutes the upper loop.

11 is a circuit having looped ends 12 and 13, the non-conducting members 14 and 15 providing means for shaping the looped ends at right angles with respect to the circuit.

Connected in series in circuit 11, are variable condenser 16 and secondary coil 17, which in practice becomes energized by primary coil 18 of the generating circuit 19.

Fig. 1 shows the arrangement of the circuit in perpendicular form and is particularly applicable for use on aviation fields where airplane landings are sometimes entirely obliterated by fog or darkness and are very hard to locate from an airplane.

I am aware of some attempts having been made to locate the landing point by inductive means and from ordinarily designed antenna and loops, but in real practice, for all intents and purposes, such promises have fallen short. For instance, the waves emitting from an inductive source, intensify to a point through the center of the source, as the length increases, and therefore offers but a small signalling area, which in itself is hard to locate. The antenna or loop offers more scope, 'tis true, but the central point identifying the landing field is so active that it involves the utmost care and practice on the part of the aviator, as well as the most sensitive instrument to effect a safe landing.

To obviate such trouble and to provide a reasonably large concentrated signaling area where it is most needed and where the center of such area of such disturbance become nil, or, in other words, provides a neutral zone, there is produced means by which an air pilot may locate the landing field. I have devised the herein described circuit in a manner that the electromagetic waves when emitted from the looped ends will assume an upward course but slightly opposing each other's axes and increasing with the distance through the center line or axis of the loops as to form an inverted cone-shaped pocket through said center wherein no electromagnetic disturbance is found. In this way the airplane on approaching the landing field, contacts with the upper broad signalling area sometime before reaching the field, and knowing his course to be a correct one, continues his flight until the neutral zone or center or pocket of electromagnetic waves has been reached at which time he may elect to commence his downward curve. The dead space or neutral zone forms an inverted cone with magnetic emanations on the exterior thereof whereby the diameter of the circular downward flight of aircraft is reduced until the aircraft is ready to land when the aircraft can fly out of the magnetic field into the neutral zone. Or the pilot can continue on to the opposite side of the neutral zone, and, at this point, commence his downward glide, by crossing repeatedly through the magnetized field and the neutral zone to the edge of the magnetic field where the signal is faint and narrows to the landing point on the field.

To operate the device the generator 20 energizes the circuit 19 in the following manner. Through lead 21, primary coil 22, lead 23 and back to source 20. From secondary coil 24, lead 25, spark gap 26, lead 27 and back to secondary coil. From spark gap through lead 28, primary coil 18, lead 30 and back to gap. It is desired to explain that the coils 22 and 24 constitute a step-up transformer, whereas the coils 18 and 17, respectively, perform the function of an oscillation transformer with variable coupling.

Through such connection the secondary coil 17 of circuit 11 becomes energized in turn, the circuit of which may be traced as follows:

From secondary coil 17 lead 31 to loop formation 32, 33, 34, 35 and 36 and through lead 37, variable condenser 16. The lower loop is formed in the same way, leads 38, loop formation 39, 40, 41, 42 and 43, and thence through lead 44 to other end of secondary coil 17.

It must be noted and appreciated that with such means only ordinary care may be exercised, there being no need of elaborate instrument or quick expert decision, the mere "listening in" sufficing to guide the pilot to the desired spot on the field.

While I have shown the construction of the circuit above the ground the whole may be placed below the ground, or in any other way where the special form of the circuit is preserved and suitably insulated from the ground.

Having now fully described my invention what I claim as new and desire to secure by Letters Patent is:

1. In the art of radiosignaling, a plurality of concentrically positioned radioconductors connected to act magnetically one upon another differentially and means connected to said conductors for establishing an approximately disturbed field of electro-magnetic waves with a neutral zone within the disturbed field directly above said conductors.

2. A plurality of substantially closed concentric oscillatory loops, one of said loops being arranged in one horizontal plane and another of said loops being arranged in a different horizontal plane, substantially spaced from the other, in combination with inductive means for establishing electrical oscillations of high frequency currents in the loops, and a circuit connection between said inductive means and said loops whereby the magnetic field set up by one of said loops opposes the magnetic field set up by another of said loops.

3. In the art of radiosignaling, a plurality of oscillatory loops formed by a continuous conductor, said loops being arranged so that the magneto motive force of one opposes that of another, the loops being spaced substantially parallel to each other and differentially connected to produce an electro-magnetic field, the direction and area of which field is determined by the position of the loops and the wave length employed.

4. In the art of radiosignaling, a conductor comprising a plurality of oscillatory loops, means to excite said conductor with high frequency currents, said loops being concentrically positioned one below the other and differentially electrically connected with said means and operating to generate a field of magnetic disturbances extending in an upwardly and outwardly direction and having a neutral field immediately above said loops.

5. In the art of radiosignaling, a conductor comprising a plurality of oscillatory loops formed by substantially closed metallic circuits, means to excite said loops in opposition to each other with high frequency energy, said loops being spaced in substantially parallel relation to each other to produce by such opposition a field of magnetic disturbances emanating from said loops in an upwardly and outwardly direction.

6. In a landing system for aircraft, the combination with a landing field of a pair of horizontally extending loop conductors spaced one from the other, in a vertical direction, connections between the ends of said loop conductors, tuning means interposed in said connections and means for impressing upon said loop conductors a source of high frequency oscillations, said loop conductors being arranged in such manner that the field emanating from one of said loop conductors tends to react with the field emanating from the other of said loop conductors, whereby a radiofrequency field of force having a substantially inert center is radiated in the area immediately over said landing field, whereby an aircraft may be navigated within said field of force and within said inert center for locating the position of said landing field.

7. A system for landing aircraft, comprising in combination with a landing field a pair of horizontally extending loop conductors conductively connected and extending substantially parallel with each other and with the plane of said landing field, means for impressing high frequency oscillations upon said conductive connections intermediate said loop conductors whereby a radiofrequency field of force is radiated in a vertical direction over said landing field with the field of force from one of said loop conductors tending to oppose the field of force from the other of said loop conductors whereby a standing field of force is created over said landing field having a substantially inert central portion into which aircraft may be navigated for locating the landing field.

8. An aircraft landing system comprising in combination with an aircraft landing field an electrical conductor including a tuning circuit, said electrical conductor being substantially bent upon itself in such form as to enclose two substantially equal areas, with one of said areas extending in a substantially horizontal plane above the surface of said landing field and the other of said areas extending in a horizontal plane at a distance spaced from said first mentioned area, means for impressing radiofrequency oscillations upon said tuning circuit whereby the conductor in each of said areas tends to radiate a radiofrequency field of force independently, one from the other, whereby a substantially permanent radiofrequency field is set up above said landing field having an active outer surface and a substantially inert center whereby aircraft may be navigated through said active surface and said inert center in locating said landing field.

In testimony whereof I affix my signature.

JOHN A. WILLOUGHBY.